United States Patent
Chen et al.

(10) Patent No.: US 9,323,039 B2
(45) Date of Patent: Apr. 26, 2016

(54) PARTICLE MANIPULATION SYSTEM AND PROJECTION DEVICE

(71) Applicant: Industrial Technology Research Institute, Hsinchu (TW)

(72) Inventors: Hsiu-Hsiang Chen, Hsinchu County (TW); Hsin-Hsiang Lo, Hsinchu County (TW); Chun-Chuan Lin, Hsinchu (TW); Kuo-Yao Weng, Hsinchu (TW); Chi-Shen Chang, Hsinchu County (TW); Jyh-Chern Chen, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 290 days.

(21) Appl. No.: 14/072,802

(22) Filed: Nov. 6, 2013

(65) Prior Publication Data

US 2014/0124373 A1    May 8, 2014

Related U.S. Application Data

(60) Provisional application No. 61/723,305, filed on Nov. 6, 2012.

(51) Int. Cl.
*G03B 27/54* (2006.01)
*G02B 21/32* (2006.01)
(Continued)

(52) U.S. Cl.
CPC ............... *G02B 21/32* (2013.01); *G02B 15/22* (2013.01); *G02B 21/086* (2013.01); *G03B 21/16* (2013.01); *G03B 21/2033* (2013.01); *G03B 21/28* (2013.01)

(58) Field of Classification Search
CPC ...................................... G02B 21/32

USPC .............. 355/67, 71; 353/39, 52, 98; 359/683
See application file for complete search history.

(56) References Cited

U.S. PATENT DOCUMENTS 6,243,197 B1   6/2001  Schalz
6,657,782 B2   12/2003 Yonezawa
(Continued)

FOREIGN PATENT DOCUMENTS

EP    2028518    2/2009
GB    2076176    11/1981
(Continued)

OTHER PUBLICATIONS

Ohta et al., "Dynamic Cell and Microparticle Control via Optoelectronic Tweezers," Journal of Microelectromechanical Systems 16 (3), Jun. 2007, pp. 491-499.
(Continued)

*Primary Examiner* — Hung Henry Nguyen
(74) *Attorney, Agent, or Firm* — Jianq Chyun IP Office

(57) ABSTRACT

A particle manipulation system and a projection device are provided. The projection device includes an image source and a projection lens. The image source provides an image beam. The projection lens is disposed on a light path of the image beam and includes a zoom lens set and a focusing lens set. The zoom lens set is disposed on the light path of the image beam from the image source and includes at least two lens groups disposed in sequence on the light path of the image beam. The focusing lens set is disposed on the light path of the image beam. The zoom lens set is disposed between the image source and the focusing lens set. A photoconductor chip is disposed on the light path of the image beam from the projection lens.

37 Claims, 15 Drawing Sheets

(51) Int. Cl.
*G02B 15/22* (2006.01)
*G02B 21/08* (2006.01)
G03B 21/16 (2006.01)
G03B 21/28 (2006.01)
G03B 21/20 (2006.01)

(56) References Cited

U.S. PATENT DOCUMENTS

| | | | |
|---|---|---|---|
| 6,885,492 | B2 | 4/2005 | DeSimone et al. |
| 7,612,355 | B2 | 11/2009 | Wu et al. |
| 7,826,147 | B2 | 11/2010 | Ichimura et al. |
| 8,218,244 | B2 | 7/2012 | Lin et al. |
| 2003/0209438 | A1 | 11/2003 | Bressler |

FOREIGN PATENT DOCUMENTS

| | | |
|---|---|---|
| JP | 2004-133341 | 4/2004 |
| JP | 4997834 | 8/2012 |
| TW | I393915 | 4/2013 |

OTHER PUBLICATIONS

Chiou et al., "Massively parallel manipulation of single cells and microparticles using optical images," Nature 436, Jul. 21, 2005, pp. 370-372.

Hoeb et al., "Light-Induced Dielectrophoretic Manipulation of DNA," Biophysical Journal 93, Aug. 2007, pp. 1032-1038.

Choi et al., "Programmable manipulation of motile cells in optoelectronic tweezers using a grayscale image," Appl. Phys. Lett. 93, Oct. 6, 2008, pp. 143901-1-143901-3.

Hsu et al., "Phototransistor-based optoelectronic tweezers for dynamic cell manipulation in cell culture media," Lab on a Chip 10, Jan. 21, 2010, pp. 165-172.

Lin et al., "Separation of micro-particles utilizing spatial difference of optically induced dielectrophoretic forces," Microfluid Nanofluid (2010), May 19, 2009, pp. 217-229.

PARTICLE MANIPULATION SYSTEM AND PROJECTION DEVICE

CROSS-REFERENCE TO RELATED APPLICATION

This application claims the priority benefits of U.S. provisional application Ser. No. 61/723,305, filed on Nov. 6, 2012. The entirety of the above-mentioned patent applications is hereby incorporated by reference herein and made a part of this specification.

TECHNICAL FIELD

The technical field relates to a particle manipulation system and a projection device.

BACKGROUND

In the field of biomedical science, it is a key technology to efficiently separate biological cells without damaging them, especially for detecting tumor cells, stem cells, embryos, bacteria, etc. However, the conventional cell control technology, such as optical tweezers, electrophoresis, dielectrophoresis, travelling-wave dielectrophoresis, electrorotation, magnetic tweezers, acoustic traps, and hydrodynamic flows, can not achieve both of high resolution and high flux, wherein although the optical tweezers can achieve high resolution to capture a single particle, it has a control area only about 100 $\mu m^2$. Moreover, the optical tweezers achieve a light intensity of $10^7$ W/cm$^2$, which is easy to cause local overheating, easy to cause cells dead or inactive. As a result, the optical tweezers is not adapted to long-term operation.

In addition, although the electrophoresis and the dielectrophoresis can achieve high flux, they cannot achieve high spatial resolution, and they cannot control a single cell. Moreover, the dielectrophoresis flow field chip generally has a single function, such as a transmission function or a separation function. If different flow fields are required, it is needed to redesign a new photomask and to perform coating, photolithography, and etching to produce fixed electrodes, which costs much and expend much time and effort.

SUMMARY

One of exemplary embodiments provides a particle manipulation system including a projection device and a photoconductor chip. The projection device includes an image source and a projection lens. The image source provides an image beam. The projection lens is disposed on a light path of the image beam and includes a zoom lens set and a focusing lens set. The zoom lens set is disposed on the light path of the image beam from the image source and includes at least two lens groups disposed in sequence on the light path of the image beam. The focusing lens set is disposed on the light path of the image beam. The zoom lens set is disposed between the image source and the focusing lens set. When the zoom lens set is zooming, a distance along the light path of the image beam between the image source and the focusing lens set is not changed, and an interval between the at least two lens groups is changed to achieve zooming. The photoconductor chip is disposed on the light path of the image beam from the projection lens.

One of exemplary embodiments provides a projection device configured to project a microimage onto an image side. The projection device includes an image source and a microimage projection lens. The image source provides an image beam. The microimage projection lens is disposed on a light path of the image beam and includes a zoom lens set and a focusing lens set. The zoom lens set is disposed on the light path of the image beam from the image source and includes at least two lens groups disposed in sequence on the light path of the image beam. The focusing lens set is disposed on the light path of the image beam. The zoom lens set is disposed between the image source and the focusing lens set. When the zoom lens set is zooming, a distance along the light path of the image beam between the image source and the focusing lens set is not changed, and an interval between the at least two lens groups is changed to achieve zooming. The microimage projection lens forms an infinity-corrected microscope optical system.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
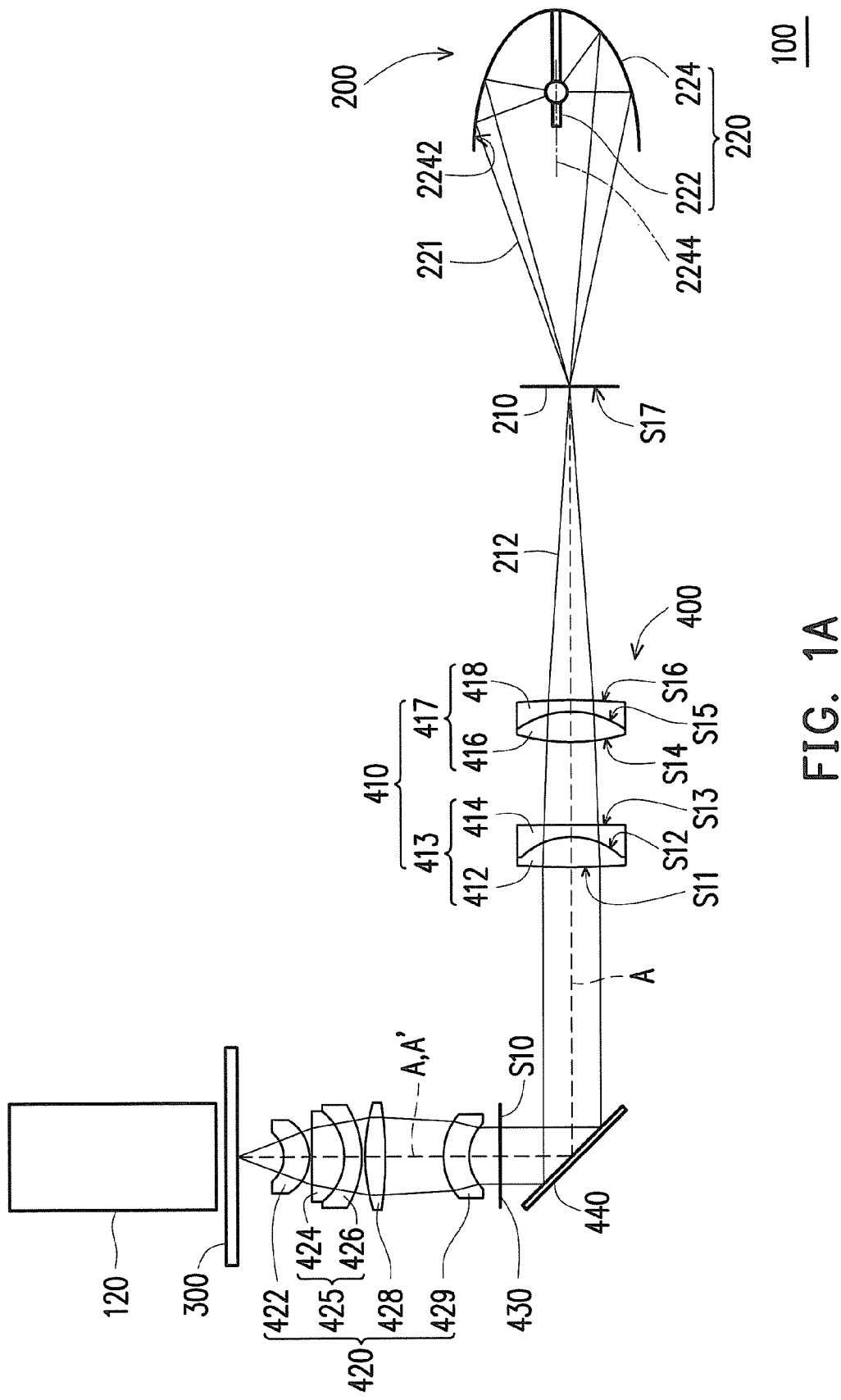
FIG. 1A is a schematic view of a particle manipulation system according to an exemplary embodiment.
Figure 1B:
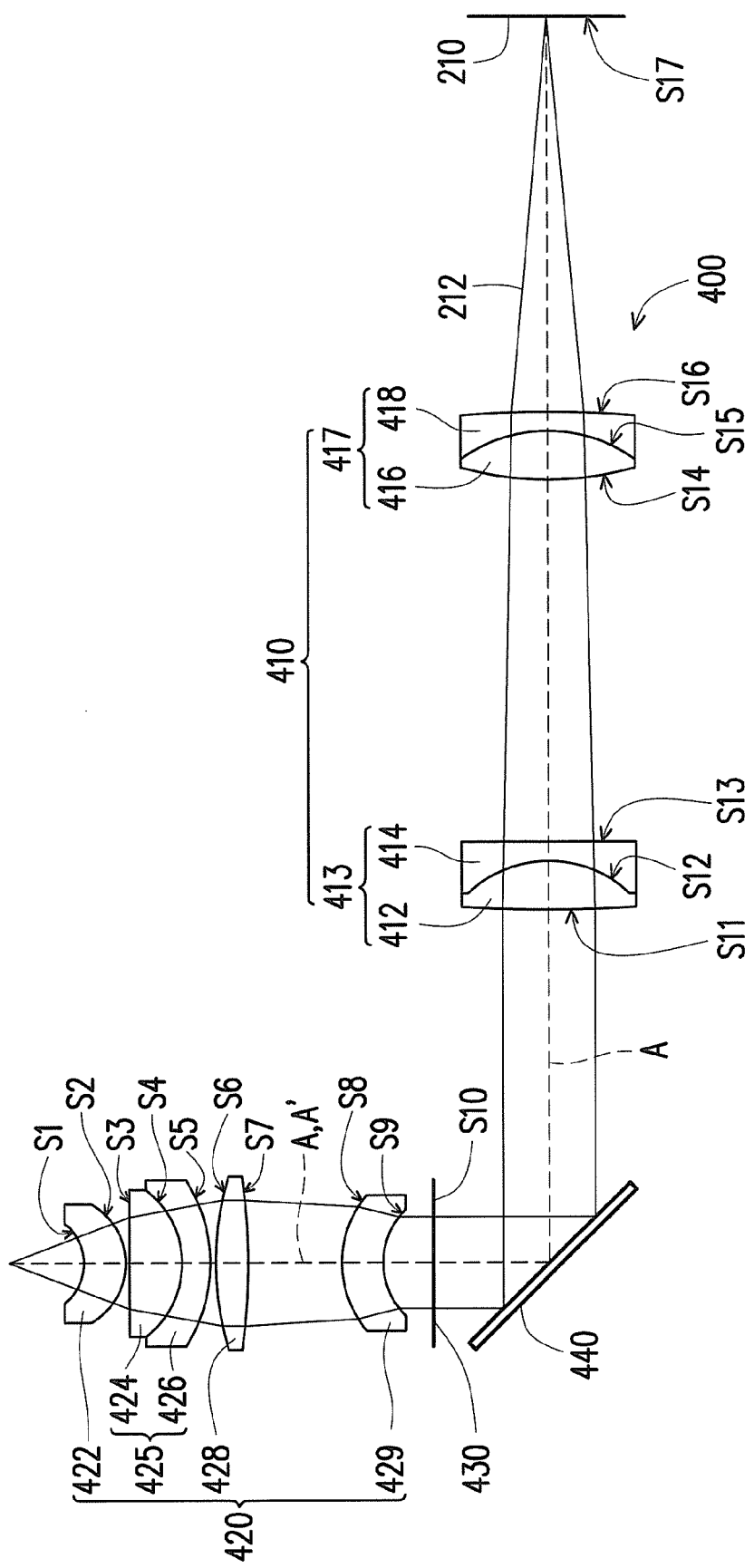
FIGS. 1B, 1C, and 1D show the projection lens in FIG. 1A respectively at a tele-end, a middle position, and a wide-end.
Figure 1C:
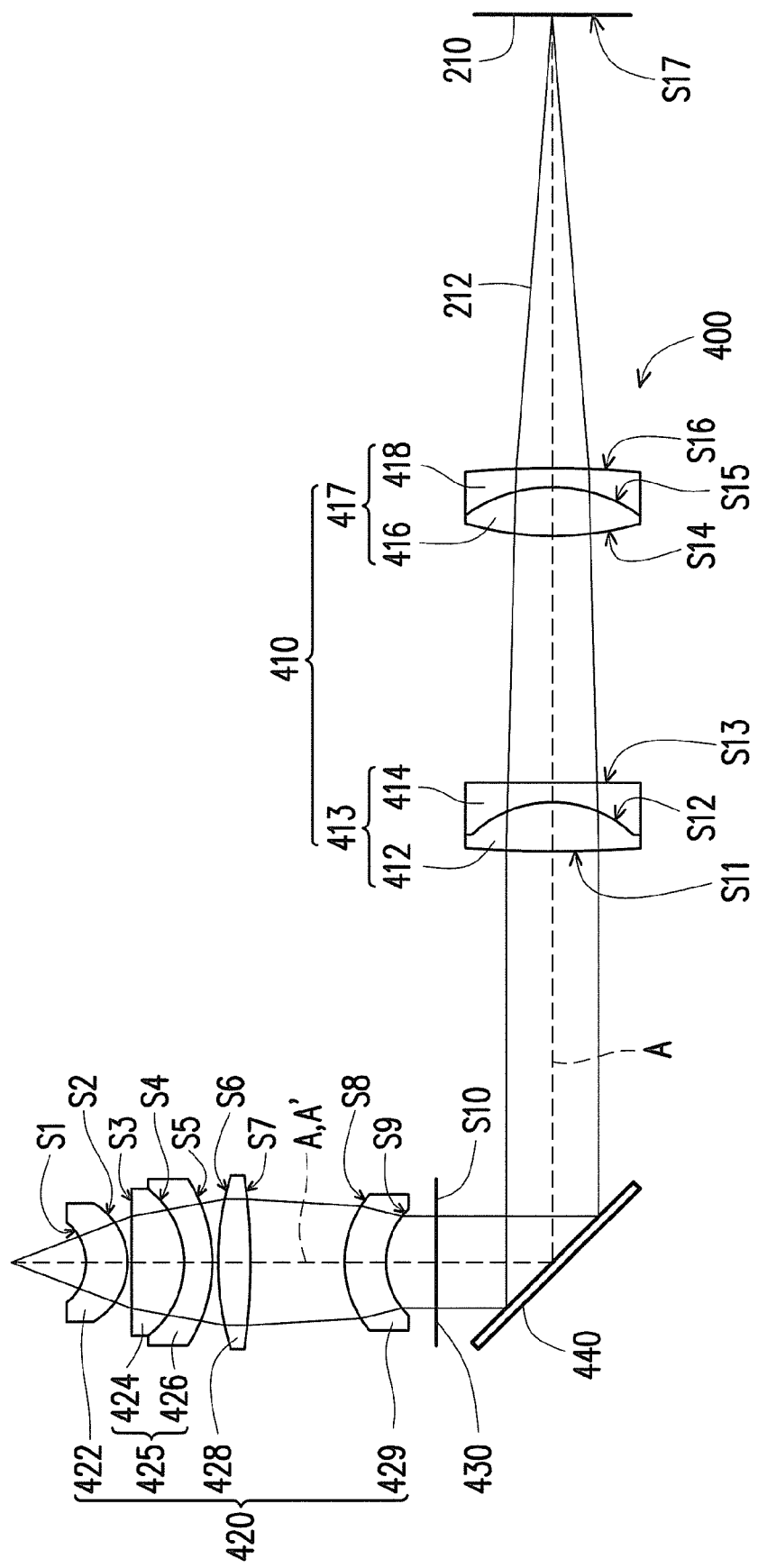
Figure 1D:
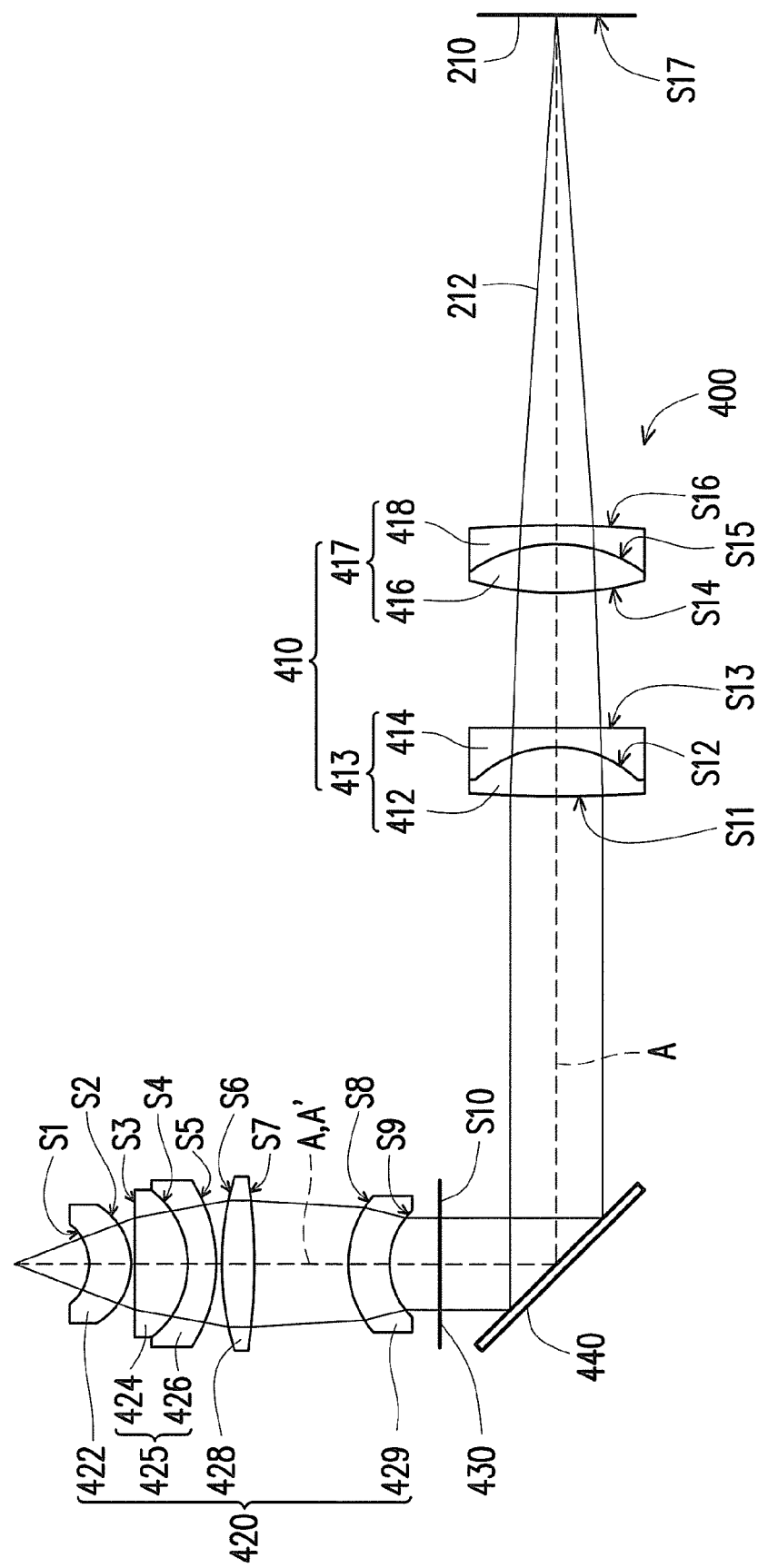

FIG. 1A is a schematic view of a particle manipulation system according to an exemplary embodiment, and FIGS. 1B, 1C, and 1D shows the projection lens in FIG. 1A respectively at a tele-end, a middle position, and a wide-end. Referring to FIGS. 1A to 1D, the particle manipulation system 100 in this embodiment includes a projection device 200 and a photoconductor chip 300. The projection device 200 includes an image source 210 and a projection lens 400. The image source 210 provides an image beam 212. In this embodiment, the projection device 200 further includes a lamp 220 emitting an illumination beam 221, and the image source 210 is a light valve converting the illumination beam 221 into the image beam 212. In this embodiment, the image source 210 is a transmissive liquid crystal display panel. However, in other embodiments, the image source 210 may be a reflective light valve, e.g., a digital micro-mirror device (DMD) or a liquid-crystal-on-silicon (LCOS) panel. Alternatively, in still other embodiments, the image source 210 may be a self-luminescent display panel, for example, a light-emitting diode (LED) display panel or an organic light-emitting diode (OLED) display panel, and the projection device 200 does not include the lamp 220. In this embodiment, the lamp 220 includes a lamp cover 224 and a lampwick 222. The lamp cover 224 has a light exit opening 2242, and the lampwick 222 is disposed inside the lamp cover 224. The lamp cover 224 is a reflective lamp cover 224 and configured to reflect the light from the lampwick 222 to the light exit opening 2242 and cause the light to pass through the light exit opening 2242, so as to form the illumination beam 221.

The projection lens 400 is disposed on a light path of the image beam 212 and includes a zoom lens set 410 and a focusing lens set 420. The zoom lens set 410 is disposed on the light path of the image beam 212 from the image source 210 and includes at least two lens groups (for example, a first lens group 413 and a second lens group 417 shown in FIG. 1A) disposed in sequence on the light path of the image beam 212. The focusing lens set 420 is disposed on the light path of the image beam 212. The zoom lens set 410 is disposed between the image source 210 and the focusing lens set 420. When the zoom lens set 410 is zooming, a distance along the light path of the image beam 212 between the image source 210 and the focusing lens set 420 is not changed, and an interval between the at least two lens groups (e.g. the interval between the first lens group 413 and the second lens group 417) is changed to achieve zooming. The photoconductor chip 300 is disposed on the light path of the image beam 212 from the projection lens 400.

Figure 2A:
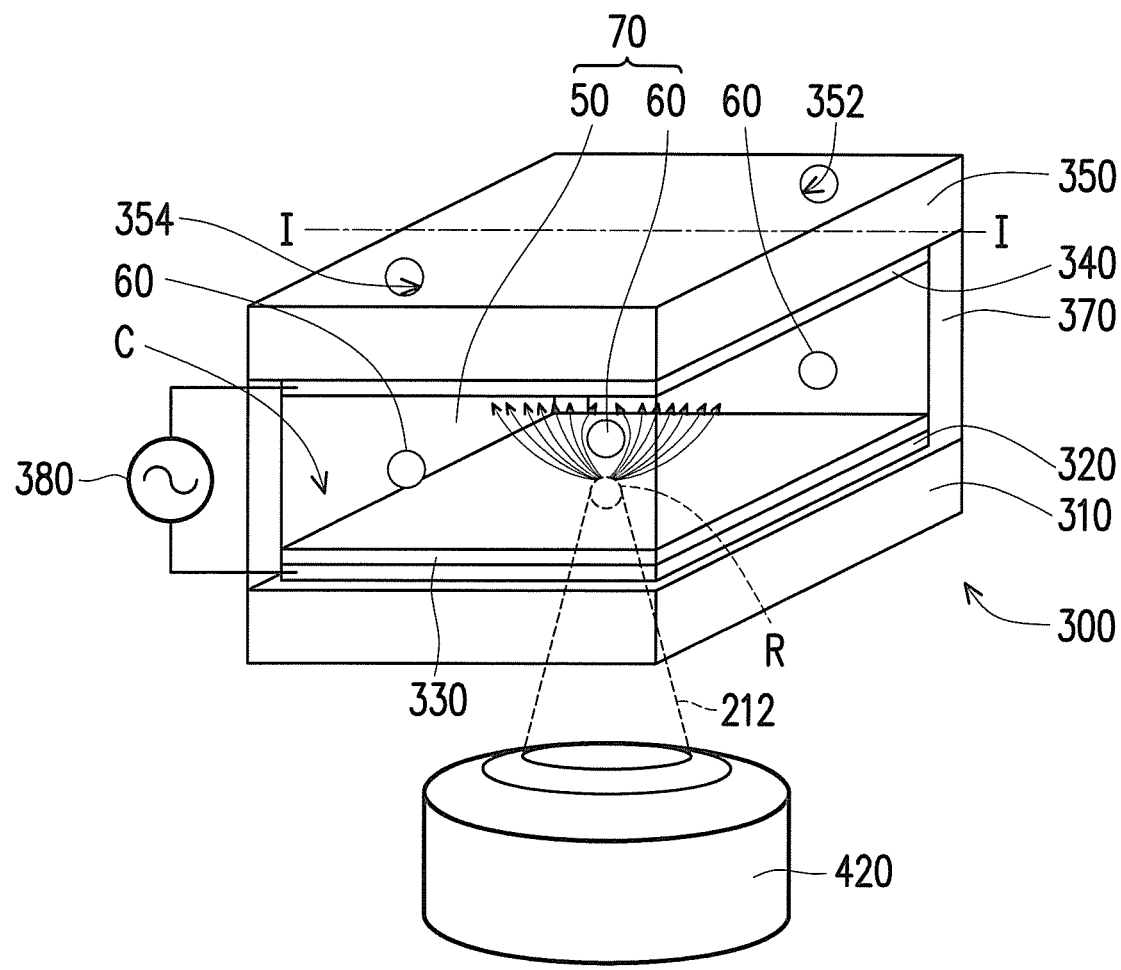
FIG. 2A is a schematic perspective view of the photoconductor chip shown in FIG. 1A.
Figure 2B:
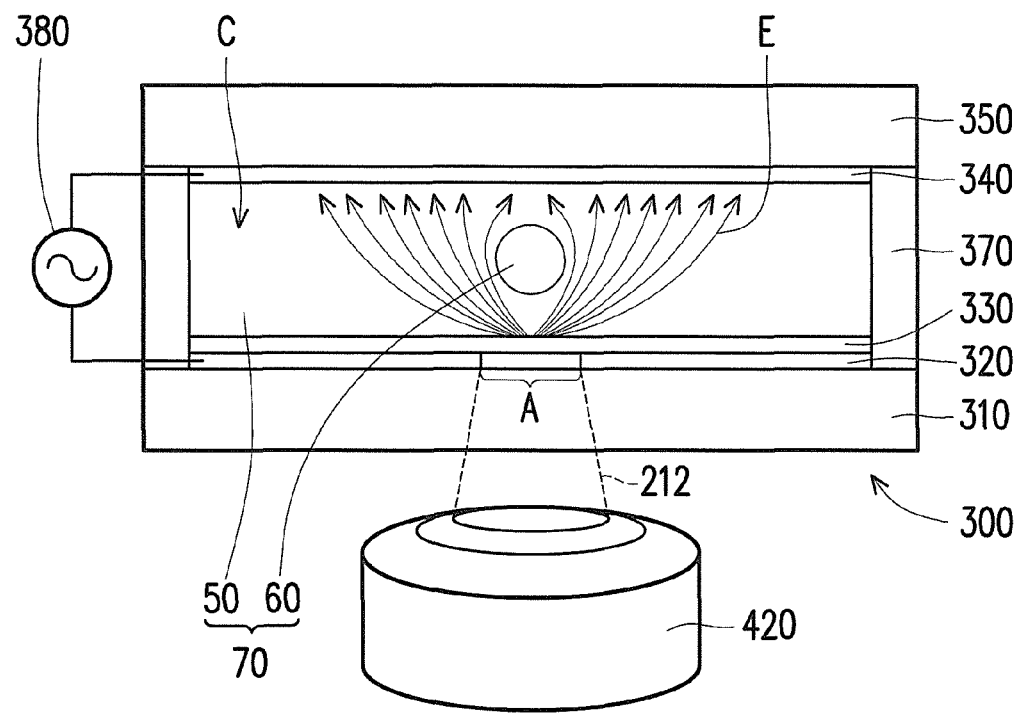
FIG. 2B is a schematic cross-sectional view of the photoconductor chip along line I-I shown in FIG. 2A.
Figure 2C:
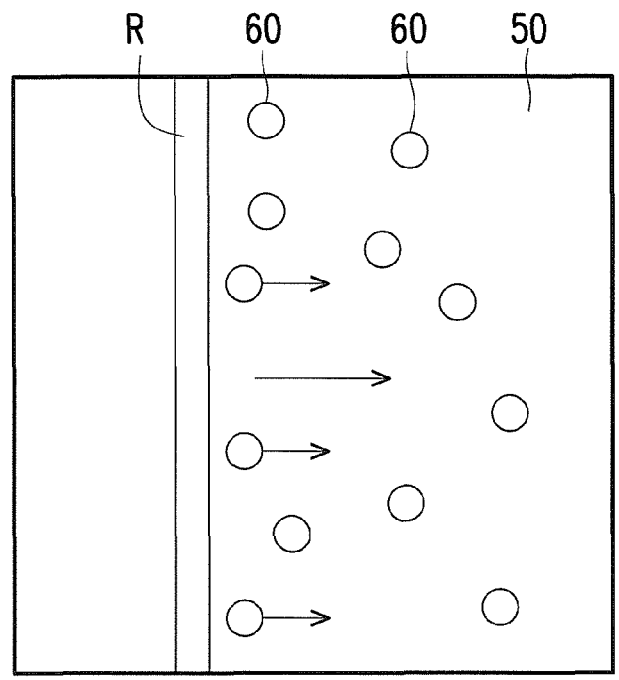
FIG. 2C shows particles are controlled by light in the photoconductor chip in FIG. 1A.

In this embodiment, the photoconductor chip 300 is, for example, an optically-induced dielectrophoresis chip. FIG. 2A is a schematic perspective view of the photoconductor chip shown in FIG. 1A, FIG. 2B is a schematic cross-sectional view of the photoconductor chip along line I-I shown in FIG. 2A, and FIG. 2C shows particles are controlled by light in the photoconductor chip in FIG. 1A. Referring to FIGS. 1A, 2A and 2B, the photoconductor chip 300 in this embodiment includes a first substrate 310, a first conductive layer 320, a photoconductor layer 330, a second substrate 350, a second conductive layer 340, and a spacer 370. The first substrate 310 is pervious to the image beam 212. In this embodiment, the first substrate 310 and the second substrate 350 are, for example, transparent substrates which are pervious to visible light, and the image beam 212 may be a visible beam. However, in other embodiments, the image beam 212 may be an invisible beam, for example, an infrared (IR) beam or an ultraviolet (UV) beam. In this embodiment, the first substrate 310 and the second substrate 350 may be glass substrates or plastic substrates.

The first conductive layer 320 is disposed on the first substrate 310. In this embodiment, the first conductive layer 320 is a transparent conductive layer, for example, an indium tin oxide (ITO) layer. The photoconductor layer 330 is disposed on the first conductive layer 320. In this embodiment, the photoconductor layer 330 is made of hydrogenated amorphous silicon (a-Si:H), amorphous selenium (a:Se), or any other photoconductive material. Moreover, in one embodiment, the thickness of the photoconductor layer 330 is greater than or equal to 500 nm and is less than or equal to 2000 nm, so that the photoconductor layer 330 has good light transmission property and good quality and can generate stronger electrical field E. The second conductive layer 340 is disposed on the second substrate 350 and between the first substrate 310 and the second substrate 350. In this embodiment, the second conductive layer 340 is a transparent conductive layer, for example, an indium tin oxide (ITO) layer. In this embodiment, an adhesive layer (e.g. a buffer layer) may be disposed between the first conductive layer 320 and the photoconductor layer 330 to improve the quality of the photoconductor layer 330.

The spacer 370 connects the first substrate 310 and the second substrate 350, and a containing space C is formed between the first substrate 310 and the second substrate 350. In this embodiment, the spacer 370 is a sealant surrounding the containing space and bonding the first substrate 310 and the second substrate 350. In FIG. 2A, the spacer 370 is shown as transparent for the reader to see the inside of the photoconductor chip 300. However, in this embodiment, the spacer 370 is opaque. In other embodiments, the spacer 370 may be transparent or translucent. In this embodiment, the first substrate 310, the first conductive layer 320, the photoconductor layer 330, the second substrate 350, the second conductive layer 340, and the spacer 370 form an optically-induced dielectrophoresis chip.

When a voltage difference is generated between the first conductive layer 320 and the second conductive layer 340 and when the image beam 212 irradiates a part of the photoconductor layer 330, the conductivity of the part of the photoconductor layer 330 increases. Specifically, the focusing lens set 420 of the projection lens 400 projecting the image beam 212 onto the photoconductor layer 330.

In addition, a power source 380 may be configured to apply a voltage difference between the first conductive layer 320 and the second conductive layer 340. When the image beam 212 irradiates the region R and when the voltage difference is generated between the first conductive layer 320 and the second conductive layer 340, the conductivity of the part of the photoconductor layer 330 within the region R increases due to the photoelectric effect. As a result, the electrical field E originated from the first conductive layer 320, penetrating through the photoconductor layer 330, and reaching the containing space C is enhanced. The photoconductor chip 300 may have an inlet 352 and an outlet 354. The inlet 352 and the outlet 354 penetrate the second substrate 350 and the second conductive layer 340. A sample 70 may be input to the containing space C through the inlet 352. The sample 70 may include fluid 50 and particles 60 contained within the fluid 50. In this embodiment, the fluid 50 is a medium, and the particles 60 are cells. Since there is a stronger electrical field E in the portion of the containing space C above the region R, the gradient of the electrical field E around the region R may push the particles 60 (one particle 60 is exemplarily shown in FIGS. 2A and 2B, and a plurality of particles 60 are shown in FIG. 2C) around the region R. The image beam 212 may be changed by the projection device 200 so as to change the image projected onto the photoconductor layer 330. As a result, the region R irradiated by the image beam 212 changes. For example, referring to FIG. 2C, when the region R is changed to move rightwards, the particles 60 near the region R are moved rightwards with the region R. The region R irradiated by the image beam 212 is exemplarily shown as strip-shaped in FIG. 1C. However, the projection device 200 may change the shape of the region R freely to satisfy various requirements. For example, the region R may be circular-shaped, and the radius of the circle is reduced with time, so that the particles 60 can be aggregated. The shape of region R may be any shape including any regular shape or any irregular shape, so the particles 60 may be singly moved or collectively moved. Therefore, the particle manipulation system 100 can achieve various particle manipulations (e.g. cell manipulations). In other words, the photoconductor layer 330 serves as a virtual electrode, and the shape of the virtual electrode may be changed freely by the image beam 212, so as to achieve various particle manipulations.

In this embodiment, the light exit opening 2242 has an optical axis 2244, and the projection lens 400 further includes a reflector 440 disposed on the light path of the image beam 212 between the zoom lens set 410 and the focusing lens set 420 and configured to change a traveling direction of the image beam 212. In this embodiment, the reflector 440 is a mirror. However, in other embodiments, the reflector 440 may be a reflective prism. In this embodiment, the optical axis A' of the focusing lens 420 is substantially perpendicular to the optical axis 2244 of the light exit opening 2242. For example, the optical axis 2244 of the light exit opening 2242 is configured to be disposed horizontally, the optical axis A' of the focusing lens set 420 is configured to be disposed vertically, and the photoconductor chip 300 is configured to be disposed horizontally. In this way, the lamp cover 224 is disposed horizontally, so that cold air may flows from the underside of the lamp cover 224 through the light exit opening 2242 to the lampwick 222, and the cold air is heated by the lampwick 222 to become hot air flowing through the light exit opening 2242 to the upside of the lamp cover 224, so as to form thermal convection. As a result, the heat dissipation efficiency of the lamp 220 is improved, and the lift span of the lamp 220 is increased.

The projection lens 400 is, for example, a microimage projection lens. That is, the projection device 200 may be configured to project a microimage onto an image side where the photoconductor chip 300 is disposed. In this embodiment, the projection lens 400 may have a zoom ratio of about 1.35. When the projection lens 400 is at a wide-end (shown in FIG. 1D), the projection lens 400 may have a magnification of 1/8.5. When the projection lens 400 is at a tele-end (shown in FIG. 1B), the projection lens 400 may have a magnification of 1/11.5. Moreover, FIG. 1C shows that the projection lens 400 is at a middle position. Since the projection lens 400 has a zoom function, the projection lens 400 may zoom toward the tele-end when a small manipulation area is required. As a result, light energy may be concentrated on the small manipulation area, so as to reduce light loss. Moreover, the projection lens 400 may zoom toward the wide-end when a large manipulation area is required.

In this embodiment, the projection lens 400 forms an infinity-corrected microscope optical system, so that when some optical elements are disposed on the light path in the projection lens 400, the focal plane of the projection lens 400 is not changed. As a result, the projection lens 400 can project a clear and sharp image on the photoconductor chip 300. In this embodiment, the projection device 200 forms a critical illumination to illuminate the photoconductor chip 300, so that the image projected by the projection device 200 onto the photoconductor chip 300 is clear and sharp. In this way, the electrical field gradient formed in the photoconductor chip 300 is increased, so as to facilitate particle manipulations. In addition, the optical structure of the projection lens 400 is simple, so that the mechanism design and the assembly of the projection lens 400 is easy, so as to reduce the cost of the projection lens 400.

In this embodiment, the particle manipulation system 100 may further include a microscope 120 configured to monitoring the photoconductor chip 300. Specifically, the microscope 120 may monitor the movement of the particles and the change of the region R irradiated by the image beam 212.

In this embodiment, the focusing lens set 420 includes a first lens 422, a second lens 424, a third lens 426, a fourth lens 428, and a fifth lens 429 arranged on the light path of the image beam 212 in sequence from the photoconductor chip 300 to the zoom lens set 410, and the refractive powers of the first through fifth lenses 422, 424, 426, 428, and 429 are negative, positive, negative, positive, and negative, respectively. For example, the first lens 422 is a negative meniscus lens having a concave surface facing the photoconductor chip 300, the second lens 424 is a positive meniscus lens having a concave surface facing the photoconductor chip 300, the third lens 426 is a negative meniscus lens having a concave surface facing the photoconductor chip 300, the fourth lens 428 is a biconvex lens, and the fifth lens 429 is a negative meniscus lens having a convex surface facing the photoconductor chip 300. In this embodiment, the second lens 424 and third lens 426 form a double cemented lens.

In this embodiment, the projection lens 400 further includes an aperture stop 430 disposed on the light path of the image beam 212 between the focusing lens set 420 and the zoom lens set 410. Moreover, in this embodiment, the at least two lens groups of the zoom lens set 410 are a first lens group 413 and a second lens group 417 disposed on the light path of the image beam 212 in sequence from the focusing lens set 420 to the image source 210. When the zoom lens set 410 is zooming, the first lens group 413 and the second lens group 417 move with respect to the image source 210. In this embodiment, when the zoom lens set 410 zooms from the tele-end (as shown in FIG. 1B) to the wide-end (as shown in FIG. 1D), the first lens group 413 and the second lens group 417 move towards each other. That is, when the zoom lens set 410 zooms from the tele-end to the wide-end, the interval between the first lens group 413 and the second lens group 417 is decreased.

In this embodiment, the first lens group 413 includes a sixth lens 412 and a seventh lens 414 disposed on the light path of the image beam 212 in sequence from the focusing lens 420 to the second lens group 417. The second lens group 417 includes an eighth lens 416 and a ninth lens 418 disposed on the light path of the image beam 212 in sequence from the first lens group 413 to the image source 210, and the refractive powers of the sixth through ninth lenses 412, 414, 416, and 418 are positive, negative, positive, and negative, respectively. For example, the sixth lens 412 is a biconvex lens, the seventh lens 414 is a biconcave lens, the eighth lens 416 is a biconvex lens, and the ninth lens 418 is a negative meniscus lens having a convex surface facing the image source 210. In this embodiment, the sixth lens 412 and the seventh lens 414 form a double cemented lens, and the eighth lens 416 and the ninth lens 418 form another double cemented lens.

An embodiment of the projection lens 400 is given hereinafter. However, the disclosure is not limited to the data listed in the following Tables 1 and 2. For those having ordinary skill in the art, various modifications and variations may be made to the structure of the embodiment after referring to the disclosure without departing from the scope or spirit of the disclosure.

TABLE 1

| Surface | Curvature Radius (mm) | Distance (mm) | Index of Refraction | Abbe Number | Notes |
|---|---|---|---|---|---|
| S0 | Infinity | 5.51 | | | Photoconductor chip |
| S1 | −4.21 | 3.00 | 2.00 | 28.3 | First lens |
| S2 | −5.89 | 0.49 | | | |

TABLE 1-continued

| Surface | Curvature Radius (mm) | Distance (mm) | Index of Refraction | Abbe Number | Notes |
|---|---|---|---|---|---|
| S3 | −177.37 | 3.71 | 1.62 | 62.8 | Second lens |
| S4 | −7.75 | 2.00 | 1.85 | 24.1 | Third lens |
| S5 | −13.46 | 0.50 | | | |
| S6 | 26.16 | 2.37 | 1.65 | 56.2 | Fourth lens |
| S7 | −49.98 | 6.89 | | | |
| S8 | 8.85 | 3.00 | 1.76 | 27.5 | Fifth lens |
| S9 | 6.65 | 2.53 | | | |
| S10 | Infinity | D1 | | | Aperture stop |
| S11 | 235.13 | 8.00 | 1.70 | 48.1 | Sixth lens |
| S12 | −21.99 | 3.00 | 1.62 | 38.1 | Seventh lens |
| S13 | 958.21 | D2 | | | |
| S14 | 61.08 | 8.00 | 1.57 | 50.8 | Eighth lens |
| S15 | −26.67 | 3.00 | 1.74 | 32.3 | Ninth lens |
| S16 | −197.31 | D3 | | | |
| S17 | Infinity | | | | Image source |

TABLE 2

| | Focal length (mm) | | | | |
|---|---|---|---|---|---|
| | 85 | 92.5 | 100 | 107.5 | 115 |
| D1 | 81.97 | 65.16 | 51.80 | 41.25 | 33.00 |
| D2 | 22.10 | 45.50 | 65.39 | 82.51 | 97.39 |
| D3 | 63.93 | 57.33 | 50.80 | 44.24 | 37.61 |

In Table 1, the distance refers to a linear distance along the optical axis A between two neighboring surfaces. For example, the distance of the surface S3 is the linear distance along the optical axis A between the surface S3 and the surface S4. The corresponding thickness, refractive index, and Abbe number of each lens in the Notes column respectively refer to the numeral value of each distance, refractive index, and Abbe number in the same row. Moreover, in Table 1, the surfaces S1 and S2 are two opposite surfaces of the first lens 422. The surface S3 is the surface of the second lens 424 facing the photoconductor chip 300, the surface S4 is the interface between the second lens 424 and the third lens 426, and the surface S5 is the surface of the third lens 426 facing the reflector 440. The surfaces S6 and S7 are two opposite surfaces of the fourth lens 428, and the surfaces S8 and S9 are two opposite surfaces of the fifth lens 429. The surface S10 is the aperture stop 430. The surface S11 is the surface of the sixth lens 412 facing the reflector 440, the surface S 12 is the interface between the sixth lens 412 and the seventh lens 414, and the surface S13 is the surface of the seventh lens 414 facing the image source 210. The surface S14 is the surface of the eighth lens 416 facing the reflector 440, the surface S 15 is the interface between the eighth lens 416 and the ninth lens 418, and the surface S16 is the surface of the ninth lens 418 facing the image source 210. The surface S17 is the active surface of the image source 210.

The numeral values of the parameters, such as the curvature radius and the distance of each surface, are given in Table 1 and are not be repeated herein again.

Table 2 shows the ranges of D1, D2, and D3 in Table 1 and their corresponding focal lengths, i.e. 85 mm, 92.5 mm, 100 mm, 107.5 mm, and 115 mm, of the zoom lens set 410.

Figure 3A:
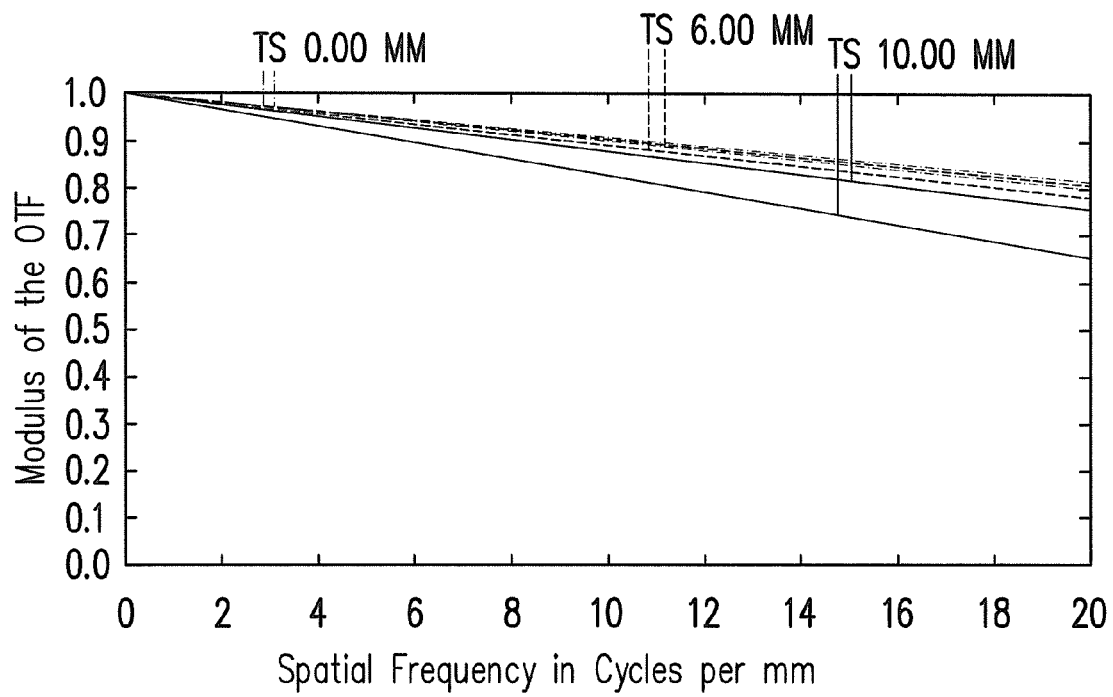
FIGS. 3A through 3C are modulation transfer function (MTF) graphs of the projection lens in FIG. 1A at the wide-end, the middle position, and the tele-end, respectively.
Figure 3B:
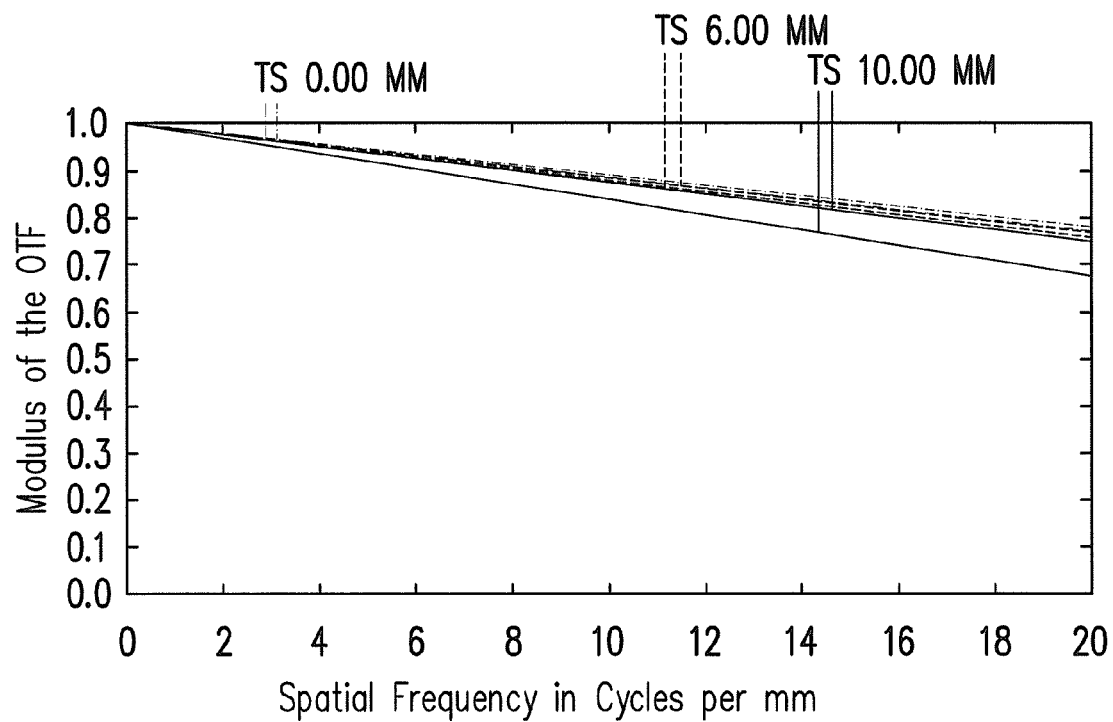
Figure 3C:
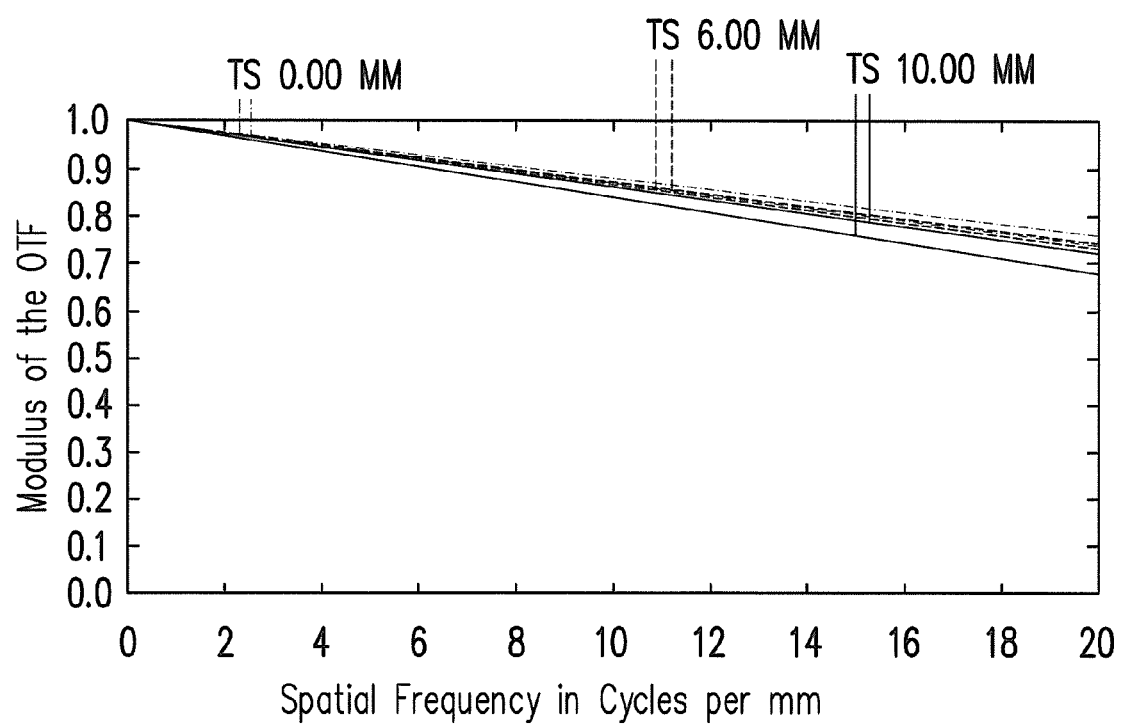

FIGS. 3A through 3C are modulation transfer function (MTF) graphs of the projection lens in FIG. 1A at the wide-end (as shown in FIG. 1D), the middle position (as shown in FIG. 1C), and the tele-end (as shown in FIG. 1B), respectively. Referring to FIGS. 3A through 3C, the transverse axis denotes a spatial frequency in cycles per millimeter, and the longitudinal axis denotes a modulus of the optical transfer function (OTF) in the fields of 0 mm, 6 mm, and 10 mm. FIG. 3A is under a condition that the focal length of the zoom lens set 410 of the projection lens 400 is 85 mm, FIG. 3B is under a condition that the focal length of the zoom lens set 410 of the projection lens 400 is 100 mm, and FIG. 3C is under a condition that the focal length of the zoom lens set 410 of the projection lens 400 is 115 mm. Since all the graphics shown in FIGS. 3A through 3C fall within a standard range, the projection lens 400 in this embodiment has good imaging quality.

Figure 4A:
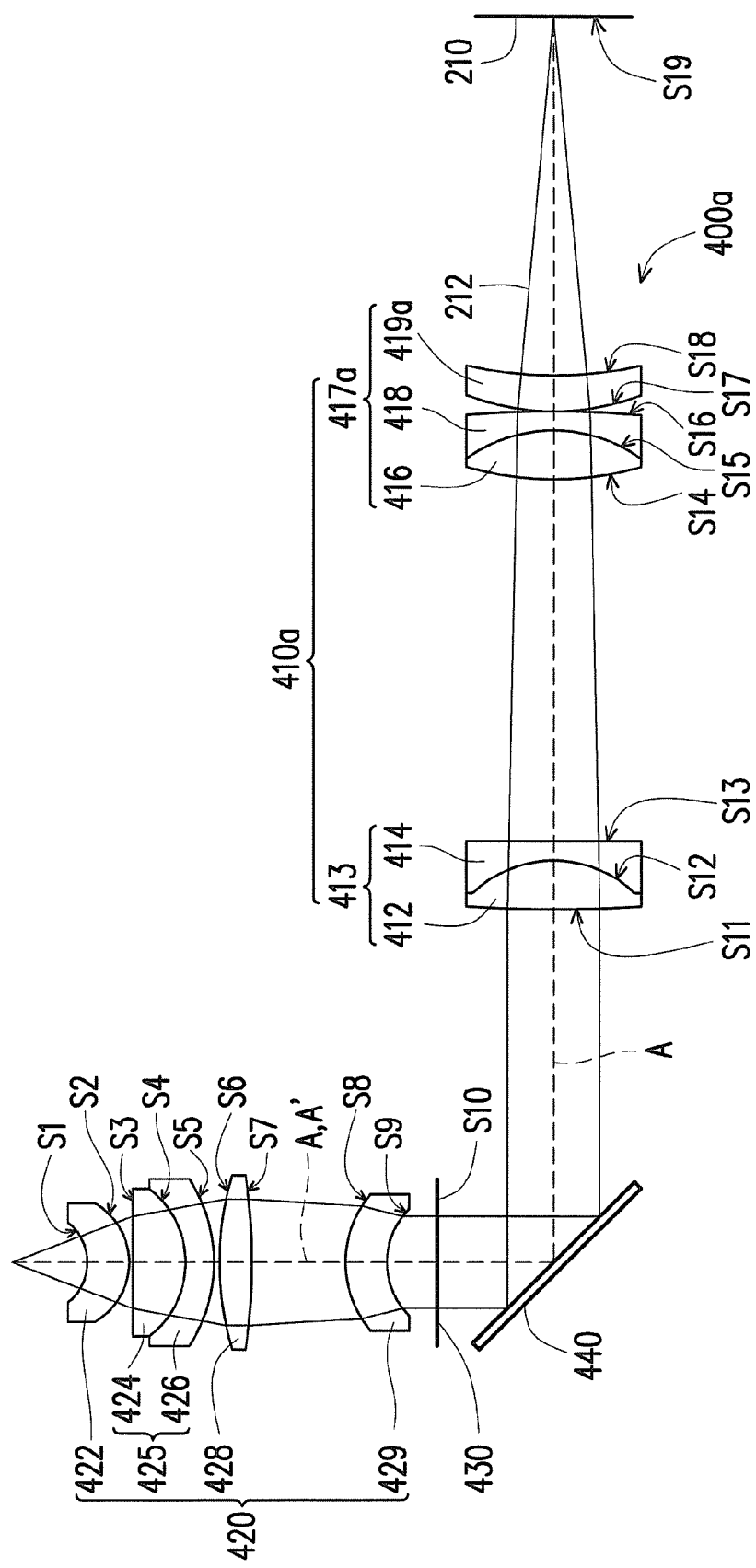
FIGS. 4A, 4B, and 4C are schematic views of the projection lens respectively at a tele-end, a middle position, and a wide-end according to another exemplary embodiment.
Figure 4B:
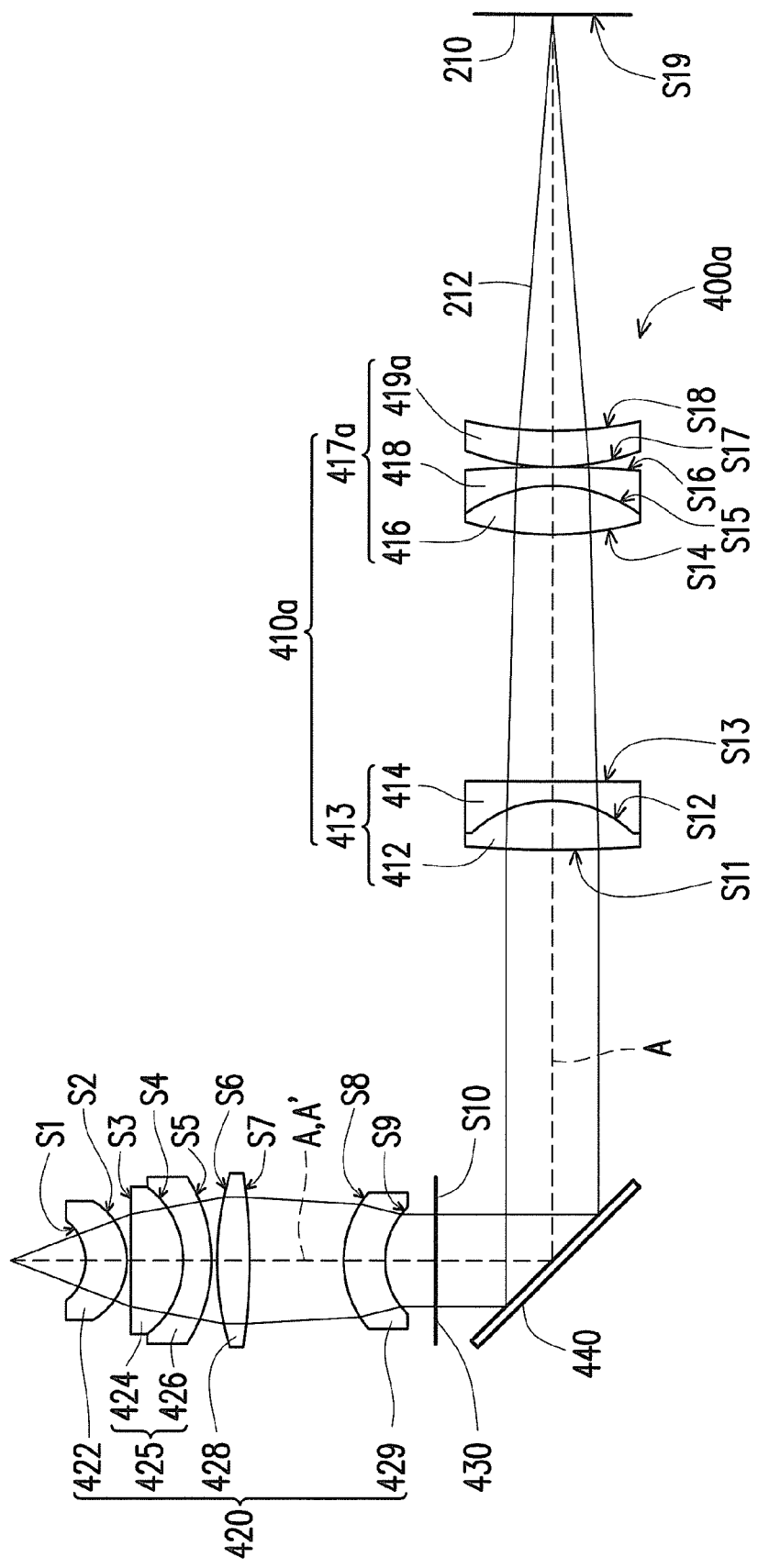
Figure 4C:
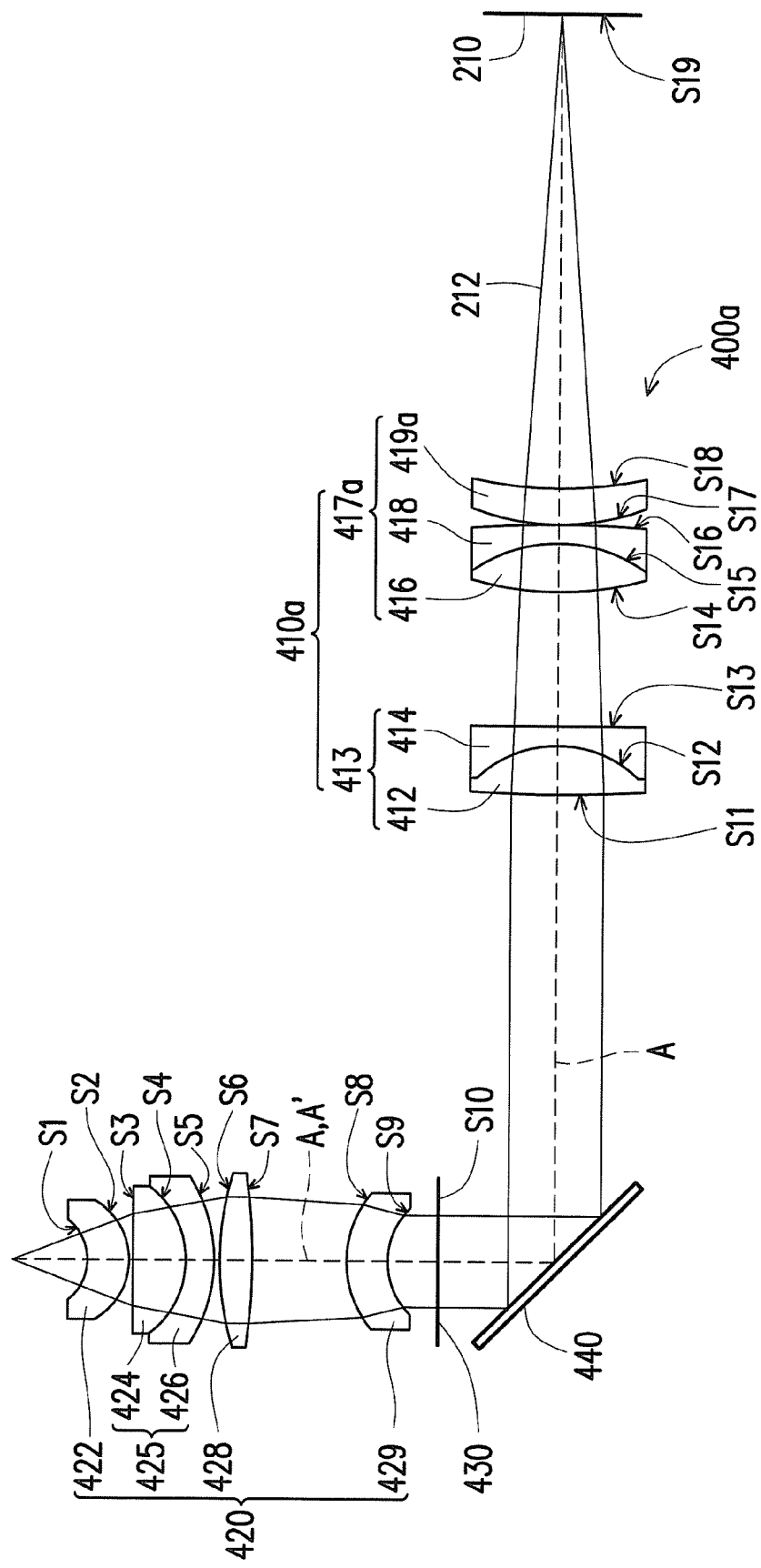

FIGS. 4A, 4B, and 4C are schematic views of the projection lens respectively at a tele-end, a middle position, and a wide-end according to another exemplary embodiment. Referring to FIGS. 4A to 4C, the projection lens 400a in this embodiment is similar to the projection lens 400 in FIG. 1A, and the difference therebetween is as follows. In this embodiment, the second lens group 417a of the zoom lens set 410a of the projection lens 400a further includes a tenth lens 419a disposed on the light path of the image beam 212 between the ninth lens 418 and the image source 210, and the refractive power of the tenth lens 419a is positive. In this embodiment, the tenth lens 419a is a positive meniscus lens having a concave surface facing the image source 210.

An embodiment of the projection lens 400a is given hereinafter. However, the disclosure is not limited to the data listed in the following Tables 3 and 4. For those having ordinary skill in the art, various modifications and variations may be made to the structure of the embodiment after referring to the disclosure without departing from the scope or spirit of the disclosure.

TABLE 3

| Surface | Curvature Radius (mm) | Distance (mm) | Index of Refraction | Abbe Number | Notes |
|---|---|---|---|---|---|
| S0 | Infinity | 5.64 | | | Photoconductor chip |
| S1 | −4.44 | 3.00 | 2.00 | 28.3 | First lens |
| S2 | −6.19 | 0.50 | | | |
| S3 | −133.17 | 3.71 | 1.61 | 55.0 | Second lens |
| S4 | −7.48 | 2.00 | 1.78 | 25.7 | Third lens |
| S5 | −13.41 | 0.50 | | | |
| S6 | 24.39 | 2.37 | 1.70 | 55.5 | Fourth lens |
| S7 | −66.62 | 6.17 | | | |
| S8 | 8.64 | 3.00 | 1.76 | 26.5 | Fifth lens |
| S9 | 6.39 | 3.10 | | | |
| S10 | Infinity | D1 | | | Aperture stop |
| S11 | 186.36 | 8.00 | 1.70 | 48.1 | Sixth lens |
| S12 | −23.17 | 3.00 | 1.62 | 38.1 | Seventh lens |
| S13 | 624.30 | D2 | | | |
| S14 | 216.31 | 8.00 | 1.57 | 50.8 | Eighth lens |
| S15 | −25.24 | 3.00 | 1.74 | 32.3 | Ninth lens |
| S16 | −157.03 | 0.50 | | | |
| S17 | 54.85 | 6.00 | 1.83 | 42.7 | Tenth lens |
| S18 | 86.75 | D3 | | | |
| S19 | Infinity | | | | Image source |

TABLE 4

| | Focal length (mm) | | | | |
|---|---|---|---|---|---|
| | 85 | 92.5 | 100 | 107.5 | 115 |
| D1 | 78.50 | 62.69 | 50.23 | 40.50 | 33.00 |
| D2 | 22.09 | 44.82 | 64.13 | 80.75 | 95.20 |
| D3 | 60.91 | 54.00 | 47.14 | 40.25 | 33.29 |

In Table 3, the distance refers to a linear distance along the optical axis A between two neighboring surfaces. For example, the distance of the surface S3 is the linear distance along the optical axis A between the surface S3 and the surface S4. The corresponding thickness, refractive index, and Abbe number of each lens in the Notes column respectively refer to the numeral value of each distance, refractive index, and Abbe number in the same row. Moreover, in Table 3, the surfaces S1 and S2 are two opposite surfaces of the first lens 422. The surface S3 is the surface of the second lens 424 facing the photoconductor chip 300, the surface S4 is the interface between the second lens 424 and the third lens 426, and the surface S5 is the surface of the third lens 426 facing the reflector 440. The surfaces S6 and S7 are two opposite surfaces of the fourth lens 428, and the surfaces S8 and S9 are two opposite surfaces of the fifth lens 429. The surface S10 is the aperture stop 430. The surface S11 is the surface of the sixth lens 412 facing the reflector 440, the surface S12 is the interface between the sixth lens 412 and the seventh lens 414, and the surface S13 is the surface of the seventh lens 414 facing the image source 210. The surface S14 is the surface of the eighth lens 416 facing the reflector 440, the surface S15 is the interface between the eighth lens 416 and the ninth lens 418, and the surface S16 is the surface of the ninth lens 418 facing the image source 210. The surfaces S17 and S18 are two opposite surfaces of the tenth lens 419a. The surface S19 is the active surface of the image source 210.

The numeral values of the parameters, such as the curvature radius and the distance of each surface, are given in Table 1 and are not be repeated herein again.

Table 4 shows the ranges of D1, D2, and D3 in Table 3 and their corresponding focal lengths, i.e. 85 mm, 92.5 mm, 100 mm, 107.5 mm, and 115 mm, of the zoom lens set 410a. FIG. 4A shows that the zoom lens set 410a is at the tele-end, FIG. 4B shows that the zoom lens set 410a is at the middle position, and FIG. 4C shows that the zoom lens set 410a is at the wide-end.

Figure 5A:
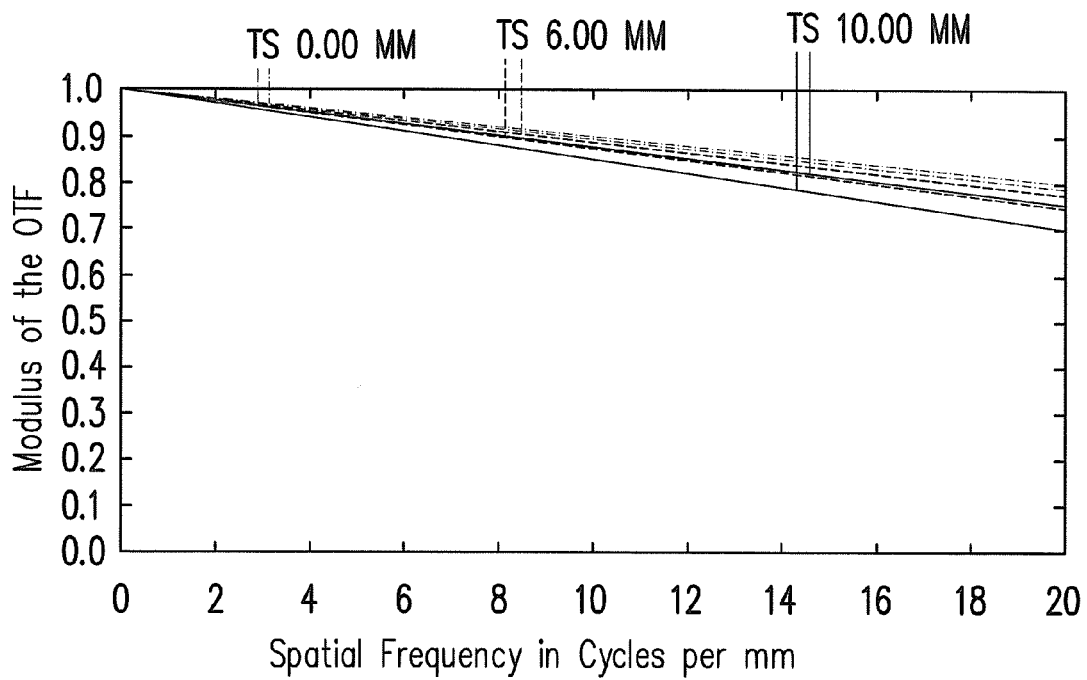
FIGS. 5A through 5C are modulation transfer function (MTF) graphs of the projection lens adopting the zoom lens set in FIGS. 4C, 4B, and 4A at the wide-end, the middle position, and the tele-end, respectively.
Figure 5B:
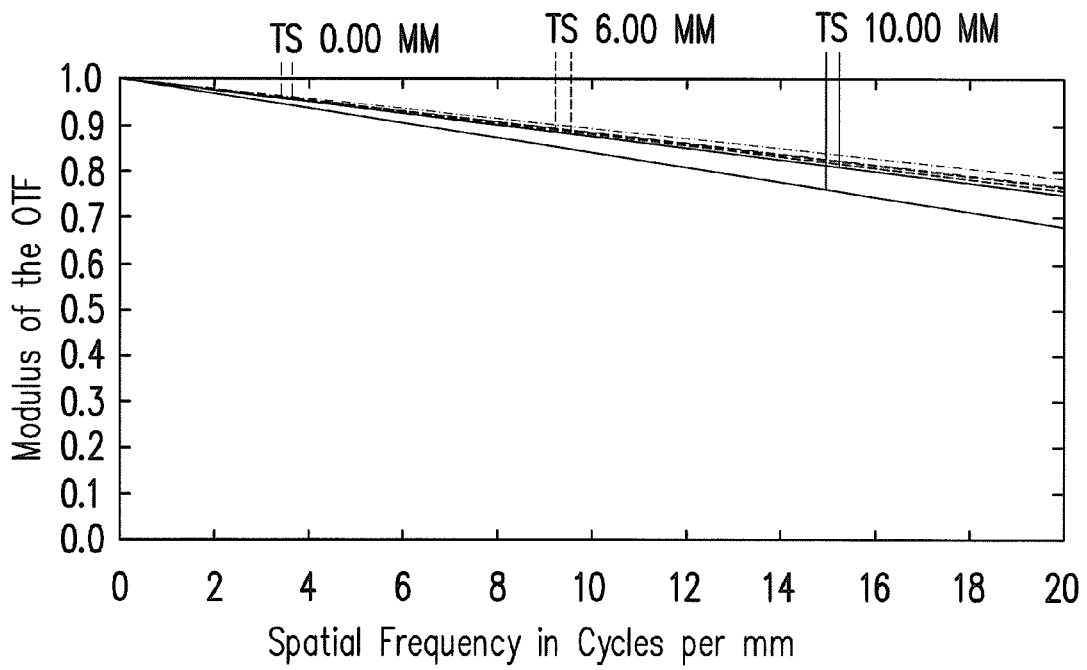
Figure 5C:
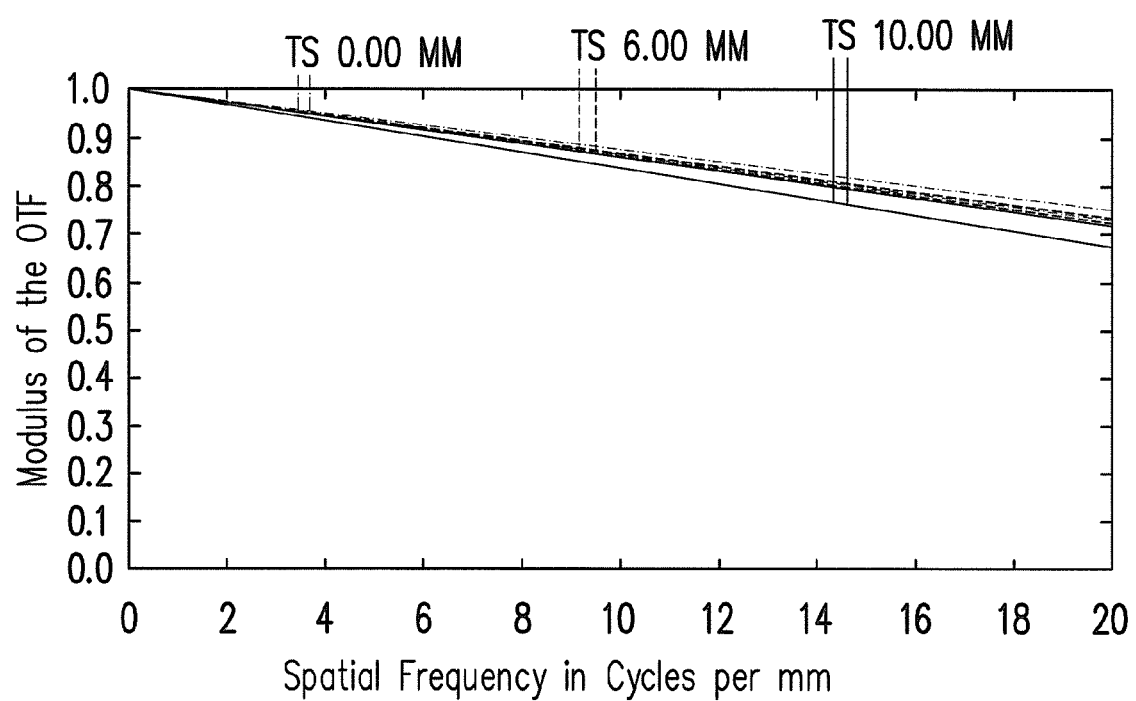

FIGS. 5A through 5C are modulation transfer function (MTF) graphs of the projection lens adopting the zoom lens set in FIGS. 4C, 4B, and 4A at the wide-end, the middle position, and the tele-end, respectively. Referring to FIGS. 5A through 5C, the transverse axis denotes a spatial frequency in cycles per millimeter, and the longitudinal axis denotes a modulus of the optical transfer function (OTF) in the fields of 0 mm, 6 mm, and 10 mm. FIG. 5A is under a condition that the focal length of the zoom lens set 410a of the projection lens is 85 mm, FIG. 5B is under a condition that the focal length of the zoom lens set 410a of the projection lens is 100 mm, and FIG. 5C is under a condition that the focal length of the zoom lens set 410a of the projection lens is 115 mm. Since all the graphics shown in FIGS. 5A through 5C fall within a standard range, the projection lens in this embodiment has good imaging quality.

Figure 6A:
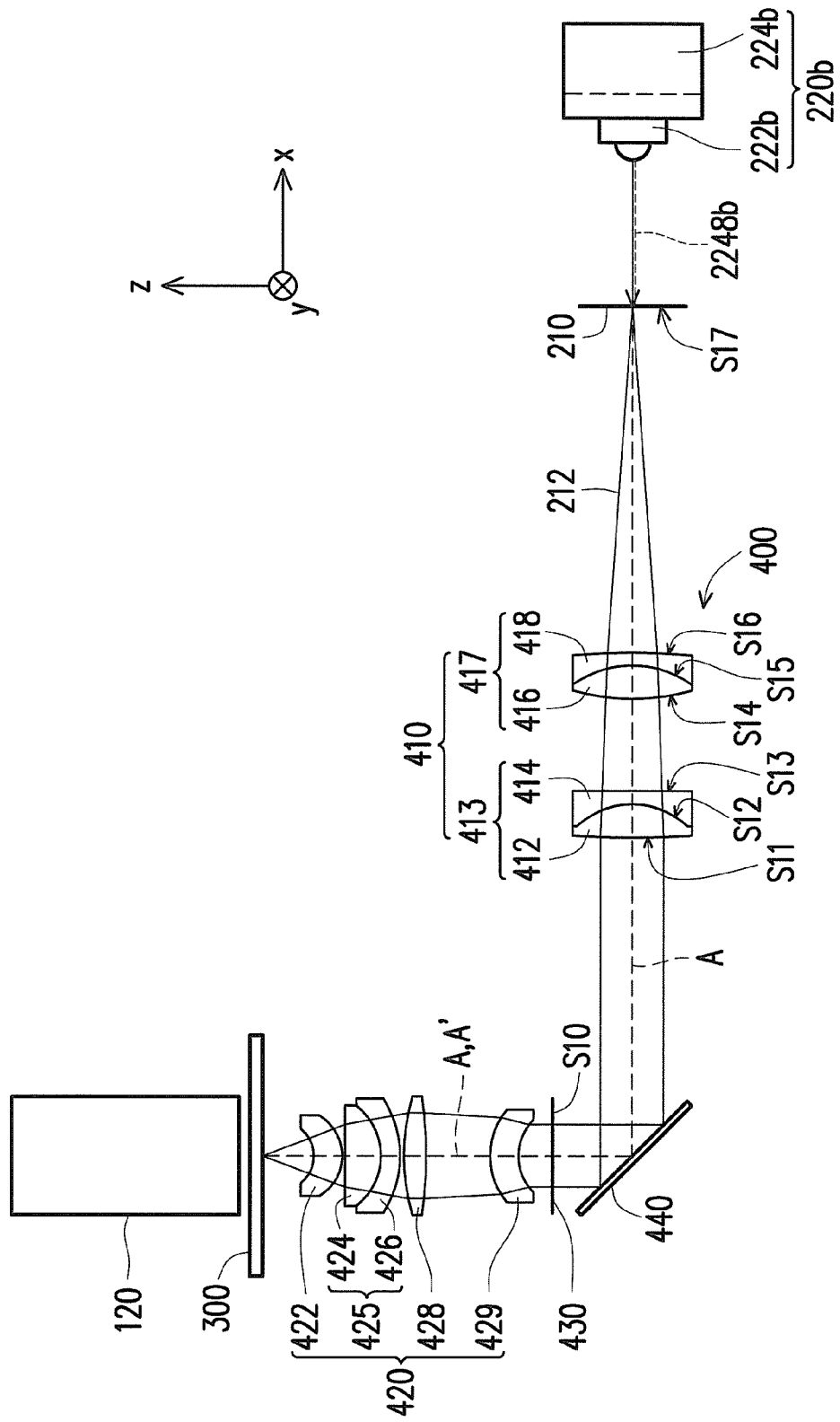
FIG. 6A is a schematic view of a particle manipulation system according to another exemplary embodiment.
Figure 6B:
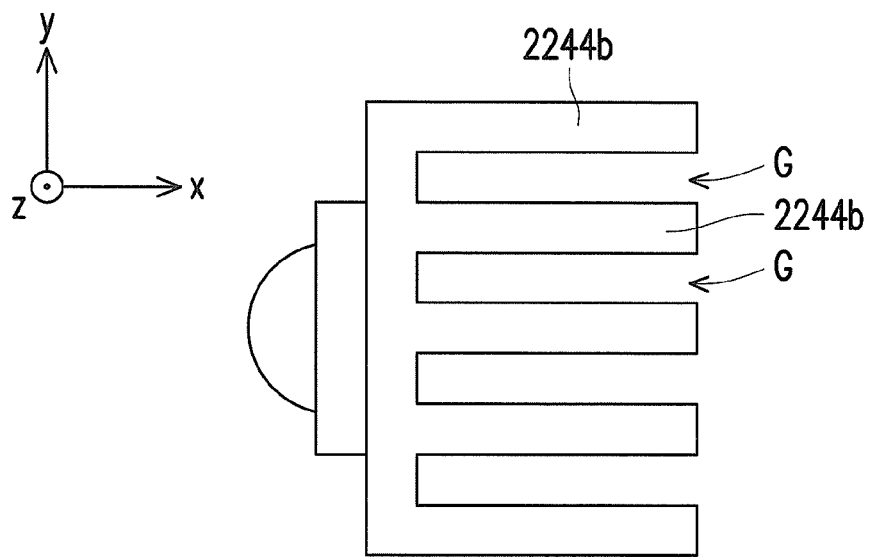
FIG. 6B shows the lamp in FIG. 6A at another viewing angle.
Figure 6C:
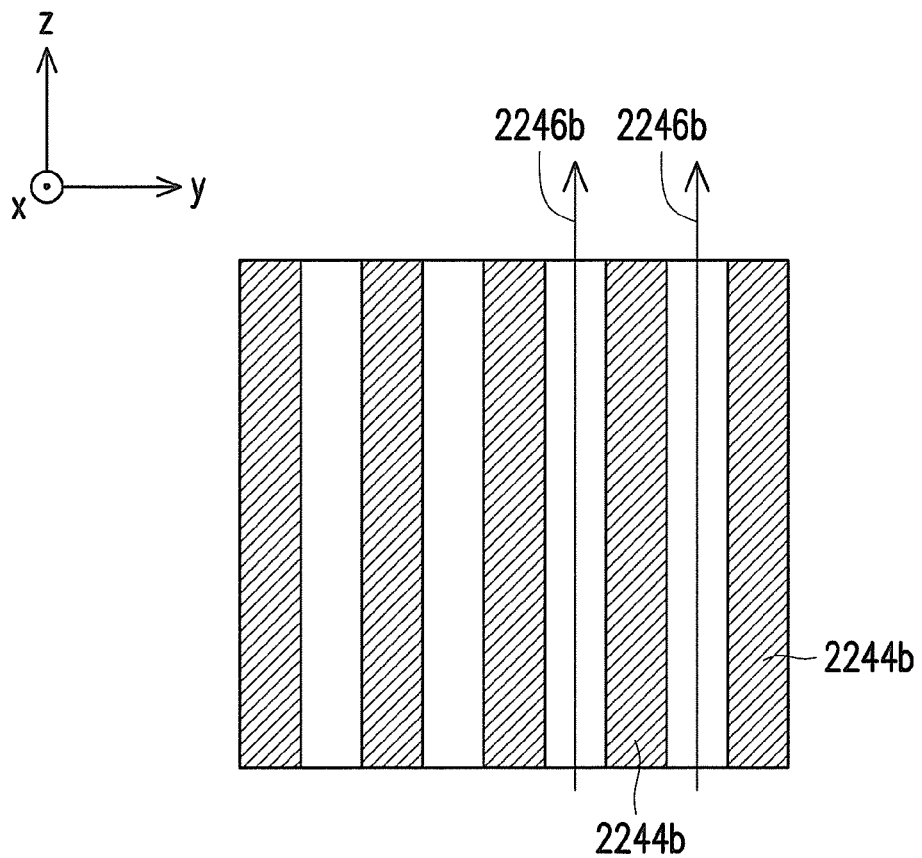
FIG. 6C shows the heat sink in FIG. 6A at another viewing angle.

FIG. 6A is a schematic view of a particle manipulation system according to another exemplary embodiment, FIG. 6B shows the lamp in FIG. 6A at another viewing angle, and FIG. 6C shows the heat sink in FIG. 6A at another viewing angle. Referring to FIGS. 6A to 6C, the particle manipulation system 100b in this embodiment is similar to the particle manipulation system 100 in FIG. 1A, and the differences therebetween are as follows. In this embodiment, the lamp 220b includes at least one light-emitting diode (LED) 222b and a heat sink 224b. The LED 222b is disposed on the heat sink 224b. The heat sink 224b includes a plurality of fins 2244b, and the gap G between any two adjacent fins 2244b forms an air channel 2246b.

In this embodiment, the optical axis of the focusing lens 420 is substantially perpendicular to the optical axis 2248b of the LED 222b, and the extension direction of the air channels 2246b is substantially parallel to the optical axis A' of the focusing lens 420. In FIGS. 6A, 6B, and 6C, the x direction is substantially parallel to the optical axis 2248b of the LED 222b and the optical axis of the zoom lens set 410, and the z direction is substantially parallel to the optical axis A' of the focusing lens 420. In addition, the x direction, the y direction, and the z direction are perpendicular to each other.

In this embodiment, the extension direction of the air channels 2246b is configured to be disposed vertically, the optical axis 2248b of the LED 222b is configured to be disposed horizontally, the optical axis A' of the focusing lens set 420 is configured to be disposed vertically, and the photoconductor chip 300 is configured to be disposed horizontally. In this way, the air channels 2246b are disposed vertically, so that cold air may flows from the underside of the heat sink 224b into the air channels 2246b, and the cold air inside the air channels 2246b is heated by the heat sink 224b to become hot air flowing out of the air channels 2246b upwards to the upside of the heat sink 224b, so as to form thermal convection. As a result, the heat dissipation efficiency of the lamp 220b is improved, and the lift span of the lamp 220b is increased.

In other embodiments, the LED 222b may be replaced by any other appropriate light-emitting device.

In conclusion, in the exemplary embodiments, the projection lens has a zoom function, so that the projection lens may zoom toward the tele-end when a small manipulation area is required. As a result, light energy may be concentrated on the small manipulation area, so as to reduce light loss. Moreover, the projection lens may zoom toward the wide-end when a large manipulation area is required. In the exemplary embodiments, the projection lens forms an infinity-corrected microscope optical system, so that when some optical elements are disposed on the light path in the projection lens, the focal plane of the projection lens is not changed. As a result, the projection lens can project a clear and sharp image on the photoconductor chip. In the exemplary embodiments, the projection device forms a critical illumination to illuminate the photoconductor chip, so that the image projected by the projection device onto the photoconductor chip is clear and sharp. In this way, the electrical field gradient formed in the photoconductor chip is increased, so as to facilitate particle manipulations. In addition, in the exemplary embodiments, the optical structure of the projection lens is simple, so that the mechanism design and the assembly of the projection lens is easy, so as to reduce the cost of the projection lens.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A particle manipulation system adapted to control a plurality of particles, comprising:
    a projection device comprising:
        an image source providing an image beam; and
        a projection lens disposed on a light path of the image beam and comprising:
            a zoom lens set disposed on the light path of the image beam from the image source and comprising at least two lens groups disposed in sequence on the light path of the image beam; and
            a focusing lens set disposed on the light path of the image beam, wherein the zoom lens set is disposed between the image source and the focusing lens set, and wherein when the zoom lens set is zooming, a distance along the light path of the image beam between the image source and the focusing lens set is not changed, and an interval between the at least two lens groups is changed to achieve zooming; and a photoconductor chip disposed on the light path of the image beam from the projection lens, wherein the particles are contained inside the photoconductor chip and the photoconductor chip controls the particles by changing the image beam from the focusing lens set.

2. The particle manipulation system according to claim 1, wherein the projection lens is a microimage projection lens.

3. The particle manipulation system according to claim 1, wherein the projection lens forms an infinity-corrected microscope optical system.

4. The particle manipulation system according to claim 1, wherein the projection lens further comprises a reflector disposed on the light path of the image beam between the zoom lens set and the focusing lens set and configured to change a traveling direction of the image beam.

5. The particle manipulation system according to claim 1, wherein the projection device further comprises a lamp emitting an illumination beam, and the image source is a light valve converting the illumination beam into the image beam.

6. The particle manipulation system according to claim 5, wherein the lamp comprises:
a lamp cover having a light exit opening, wherein the light exit opening has an optical axis; and
a lampwick disposed inside the lamp cover; and
the projection lens further comprises a reflector disposed on the light path of the image beam between the zoom lens set and the focusing lens set and configured to change a traveling direction of the image beam, wherein an optical axis of the focusing lens is substantially perpendicular to the optical axis of the light exit opening.

7. The particle manipulation system according to claim 6, wherein the optical axis of the light exit opening is configured to be disposed horizontally, the optical axis of the focusing lens set is configured to be disposed vertically, and the photoconductor chip is configured to be disposed horizontally.

8. The particle manipulation system according to claim 5, wherein the lamp comprises:
at least one light-emitting diode (LED); and
a heat sink, the LED being disposed on the heat sink, wherein the heat sink comprises a plurality of fins, a gap between any two adjacent fins forms an air channel, and
the projection lens further comprises a reflector disposed on the light path of the image beam between the zoom lens set and the focusing lens set and configured to change a traveling direction of the image beam, wherein an optical axis of the focusing lens is substantially perpendicular to the optical axis of the LED, and a extension direction of the air channels is substantially parallel to the optical axis of the focusing lens.

9. The particle manipulation system according to claim 8, wherein the extension direction of the air channels is configured to be disposed vertically, the optical axis of the LED is configured to be disposed horizontally, the optical axis of the focusing lens set is configured to be disposed vertically, and the photoconductor chip is configured to be disposed horizontally.

10. The particle manipulation system according to claim 1, wherein the photoconductor chip is an optically-induced dielectrophoresis chip.

11. The particle manipulation system according to claim 1, wherein the projection device forms a critical illumination to illuminate the photoconductor chip.

12. The particle manipulation system according to claim 1 further comprising a microscope configured to monitoring the photoconductor chip.

13. The particle manipulation system according to claim 1, wherein the focusing lens set comprises a first lens, a second lens, a third lens, a fourth lens, and a fifth lens arranged on the light path of the image beam in sequence from the photoconductor chip to the zoom lens set, and refractive powers of the first through fifth lenses are negative, positive, negative, positive, and negative, respectively.

14. The particle manipulation system according to claim 13, wherein the first lens is a negative meniscus lens having a concave surface facing the photoconductor chip, the second lens is a positive meniscus lens having a concave surface facing the photoconductor chip, the third lens is a negative meniscus lens having a concave surface facing the photoconductor chip, the fourth lens is a biconvex lens, and the fifth lens is a negative meniscus lens having a convex surface facing the photoconductor chip.

15. The particle manipulation system according to claim 1, wherein the projection lens further comprises an aperture stop disposed on the light path of the image beam between the focusing lens set and the zoom lens set.

16. The particle manipulation system according to claim 1, wherein the at least two lens groups of the zoom lens set are a first lens group and a second lens group disposed on the light path of the image beam in sequence from the focusing lens set to the image source, and wherein when the zoom lens set is zooming, the first lens group and the second lens group move with respect to the image source.

17. The particle manipulation system according to claim 16, wherein when the zoom lens set zooms from a tele-end to a wide-end, the first lens group and the second lens group move towards each other.

18. The particle manipulation system according to claim 16, wherein the first lens group comprises a sixth lens and a seventh lens disposed on the light path of the image beam in sequence from the focusing lens to the second lens group, the second lens group comprises an eighth lens and a ninth lens disposed on the light path of the image beam in sequence from the first lens group to the image source, and refractive powers of the sixth through ninth lenses are positive, negative, positive, and negative, respectively.

19. The particle manipulation system according to claim 18, wherein the sixth lens is a biconvex lens, the seventh lens is a biconcave lens, the eighth lens is a biconvex lens, and the ninth lens is a negative meniscus lens having a convex surface facing the image source.

20. The particle manipulation system according to claim 18, wherein the second lens group further comprises a tenth lens disposed on the light path of the image beam between the ninth lens and the image source, and a refractive power of the tenth lens is positive.

21. The particle manipulation system according to claim 20, wherein the sixth lens is a biconvex lens, the seventh lens is a biconcave lens, the eighth lens is a biconvex lens, the ninth lens is a negative meniscus lens having a convex surface facing the image source, and the tenth lens is a positive meniscus lens having a concave surface facing the image source.

22. A projection device configured to project a microimage onto an image side, the projection device comprising:
an image source providing an image beam; and
a microimage projection lens disposed on a light path of the image beam and comprising:

a zoom lens set disposed on the light path of the image beam from the image source and comprising at least two lens groups disposed in sequence on the light path of the image beam; and a focusing lens set disposed on the light path of the image beam, wherein the zoom lens set is disposed between the image source and the focusing lens set, and wherein when the zoom lens set is zooming, a distance along the light path of the image beam between the image source and the focusing lens set is not changed, and an interval between the at least two lens groups is changed to achieve zooming;

wherein the microimage projection lens forms an infinity-corrected microscope optical system.

23. The projection device according to claim 22, wherein the microimage projection lens further comprises a reflector disposed on the light path of the image beam between the zoom lens set and the focusing lens set and configured to change a traveling direction of the image beam.

24. The projection device according to claim 22, wherein the projection device further comprises a lamp emitting an illumination beam, and the image source is a light valve converting the illumination beam into the image beam.

25. The projection device according to claim 24, wherein the lamp comprises:
a lamp cover having a light exit opening, wherein the light exit opening has an optical axis; and
a lampwick disposed inside the lamp cover; and
the microimage projection lens further comprises a reflector disposed on the light path of the image beam between the zoom lens set and the focusing lens set and configured to change a traveling direction of the image beam, wherein an optical axis of the focusing lens is substantially perpendicular to the optical axis of the light exit opening.

26. The projection device according to claim 25, wherein the optical axis of the light exit opening is configured to be disposed horizontally, the optical axis of the focusing lens set is configured to be disposed vertically.

27. The projection device according to claim 24, wherein the lamp comprises:
at least one light-emitting diode (LED); and
a heat sink, the LED being disposed on the heat sink, wherein the heat sink comprises a plurality of fins, a gap between any two adjacent fins forms an air channel, and
the microimage projection lens further comprises a reflector disposed on the light path of the image beam between the zoom lens set and the focusing lens set and configured to change a traveling direction of the image beam, wherein an optical axis of the focusing lens is substantially perpendicular to the optical axis of the LED, and a extension direction of the air channels is substantially parallel to the optical axis of the focusing lens.

28. The projection device according to claim 27, wherein the extension direction of the air channels is configured to be disposed vertically, the optical axis of the LED is configured to be disposed horizontally, the optical axis of the focusing lens set is configured to be disposed vertically.

29. The projection device according to claim 22, wherein the focusing lens set comprises a first lens, a second lens, a third lens, a fourth lens, and a fifth lens arranged on the light path of the image beam in sequence from the image side to the zoom lens set, and refractive powers of the first through fifth lenses are negative, positive, negative, positive, and negative, respectively.

30. The projection device according to claim 29, wherein the first lens is a negative meniscus lens having a concave surface facing the image side, the second lens is a positive meniscus lens having a concave surface facing the image side, the third lens is a negative meniscus lens having a concave surface facing the image side, the fourth lens is a biconvex lens, and the fifth lens is a negative meniscus lens having a convex surface facing the image side.

31. The projection device according to claim 22, wherein the microimage projection lens further comprises an aperture stop disposed on the light path of the image beam between the focusing lens set and the zoom lens set.

32. The projection device according to claim 22, wherein the at least two lens groups of the zoom lens set are a first lens group and a second lens group disposed on the light path of the image beam in sequence from the focusing lens set to the image source, and wherein when the zoom lens set is zooming, the first lens group and the second lens group move with respect to the image source.

33. The projection device according to claim 32, wherein when the zoom lens set zooms from a tele-end to a wide-end, the first lens group and the second lens group move towards each other.

34. The projection device according to claim 32, wherein the first lens group comprises a sixth lens and a seventh lens disposed on the light path of the image beam in sequence from the focusing lens to the second lens group, the second lens group comprises an eighth lens and a ninth lens disposed on the light path of the image beam in sequence from the first lens group to the image source, and refractive powers of the sixth through ninth lenses are positive, negative, positive, and negative, respectively.

35. The projection device according to claim 34, wherein the sixth lens is a biconvex lens, the seventh lens is a biconcave lens, the eighth lens is a biconvex lens, and the ninth lens is a negative meniscus lens having a convex surface facing the image source.

36. The projection device according to claim 34, wherein the second lens group further comprises a tenth lens disposed on the light path of the image beam between the ninth lens and the image source, and a refractive power of the tenth lens is positive.

37. The projection device according to claim 36, wherein the sixth lens is a biconvex lens, the seventh lens is a biconcave lens, the eighth lens is a biconvex lens, the ninth lens is a negative meniscus lens having a convex surface facing the image source, and the tenth lens is a positive meniscus lens having a concave surface facing the image source.

* * * * *